No. 787,887. PATENTED APR. 25, 1905.
W. M. BAKER.
CHOCOLATE CONFECTION.
APPLICATION FILED APR. 20, 1904.

WITNESSES:

INVENTOR
Winthrop M. Baker
BY
Wright, Brown & Quinby
Attorneys

No. 787,887. Patented April 25, 1905.

UNITED STATES PATENT OFFICE.

WINTHROP M. BAKER, OF NEWTON, MASSACHUSETTS.

CHOCOLATE CONFECTION.

SPECIFICATION forming part of Letters Patent No. 787,887, dated April 25, 1905.

Application filed April 20, 1904. Serial No. 204,055.

*To all whom it may concern:*

Be it known that I, WINTHROP M. BAKER, of Newton, in the county of Middlesex and State of Massachusetts, have invented certain new and useful Improvements in Chocolate Confections, of which the following is a specification.

This invention relates to the manufacture of candy, and particularly to that class of candies which comprise bodies of various palatable articles and compounds, which bodies are coated with chocolate in a semifluid condition, the coating then setting or hardening.

As my present invention does not depend in any way upon the particular substance or article comprising the bodies nor upon any special compositions, including the chocolate employed for the coating, I shall herein only refer to the hitherto well-known confections as comprising bodies having chocolate coatings. Heretofore chocolate confections of this character have been dipped or otherwise coated while the chocolate coating is in a hot and soft condition capable of flowing or of being manipulated more or less, and it is common to attempt to ornament the confections more or less by manipulating the top of the coating to cause said top coating when it sets or hardens to possess fanciful or ornamental shapes or designs. Owing to the necessary consistency of the chocolate when this is done it is impossible to produce shapes or designs that are either well defined or uniform in character. The results, while frequently more pleasing to the eye than smooth-coated confections, cannot be said to be very highly ornamented, nor are they such that the ornamentations or symbols could be depended upon to determine a particular class of goods, such as "creams" or "nougats." Therefore it has heretofore been necessary to determine the contents or body of such a confection by the shape or size and sometimes the weight of the completed article.

The object of this invention is to produce chocolate confections having really ornamental characteristics and which ornamentations shall be so definitely formed as to enable them to be utilized in determining the classes of goods—in other words, to enable one when familiar with the ornaments to decide, apart from the shape or size of the completed article, what may be the nature of the body of that article.

To these ends the invention consists in the article of manufacture, substantially as hereinafter described and claimed.

Figure 1:
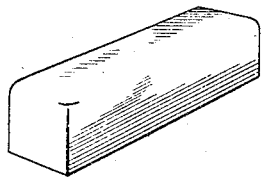
Figure 2:
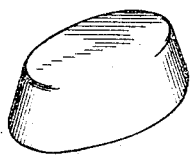
Figure 3:
Figure 4:
Figure 5:
Figure 6:
Figure 7:
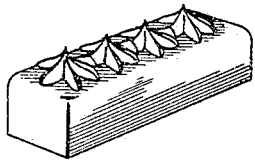
Figure 8:
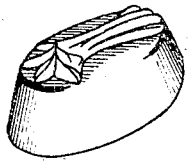
Figure 9:
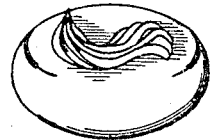

In the accompanying drawings, all of which are perspective views, Figures 1, 2, and 3 represent three different shapes of confections prior to the securing of the ornaments thereto. Figs. 4, 5, and 6 represent three different symbols or ornaments. Figs. 7, 8, and 9 represent the completed confections after the ornamentations have been applied to the coated bodies.

It is to be understood, of course, that the shapes and sizes of the confections may be varied to any extent and that the symbols or ornaments may be equally varied. In the drawings I have simply selected a few of the forms which may be adopted.

In carrying out my invention I coat a suitable body with chocolate in the ordinary manner or in any preferred manner, so as to produce a more or less smooth-coated confection without any attempt at ornamentation. I am therefore enabled to manufacture the confections practically entirely by machinery, inasmuch as the bodies may be molded by suitable machines that are well known in the art, and such bodies may be dipped or coated by machinery. Instead, however, of attempting to impart any ornamentation or configuration to the top of the coating such coating is left perfectly smooth or as smooth as may be desired. The ornaments or symbols, samples of which are shown in Figs. 4, 5, and 6, are formed of a relatively hard chocolate possessing the characteristics of retaining the shape imparted to them and of being handled without too much risk of breakage. The quality of the chocolate of which the ornaments or symbols are made is furthermore such that it may be given sharply-defined outlines. These ornaments may be applied to the coated bodies by being laid thereupon while the coatings on the tops of the bodies are relatively soft—that is, the coating of each confection while still hot or warm enough so as not to have become set or hardened will receive the ornamentation—so that the latter will be secured thereto simply by the cohesion of the parts. Some of the results of this process are illustrated in Figs. 7, 8, and 9, the complete confection differing from chocolate confections heretofore known by the clearly-defined outlines or configurations of the ornaments or symbols.

It will be readily understood that since the symbols or ornamentations are formed of a quality of chocolate which will not flow or lose its shape after removal from the molds such symbols or ornaments will always be practically identical. Therefore they may be relied upon to accurately indicate the natures of the bodies of the confections, provided they have been, of course, placed upon the proper coated bodies.

While it has been customary heretofore to rely upon the shapes and sizes of chocolate confections to indicate the particular goods, according to my invention the shapes and sizes may be utterly disregarded. However, it is preferable, of course, to vary the shapes and sizes of different articles, as well as to vary the ornaments or symbols, if only for the purpose of presenting a better appearance when assorted confections are arranged in layers.

My invention not only results in a more ornamental confection of this character than has been produced heretofore and one having a neater and more fanciful appearance, but it also enables the differences to be readily determined between confections having bodies of different flavors or materials.

Instead of forming the ornaments in molds and then completing the confections by applying such ornaments to the coatings of the bodies while such coatings are relatively soft I may allow the coatings to set or harden and then shape the ornaments by molds or tools and apply them to the coatings while the ornaments themselves are sufficiently soft or warm to adhere to the coating. In either case the consistency of the chocolate of which the ornaments are made is such that the shape of such ornaments remains sharp and clearly defined.

As will be readily understood, the more that hand-labor is dispensed with in the manufacture of confections the greater is the certainty of cleanliness in the product. As hereinbefore stated, this invention enables the confections to be made in their parts and then combined practically entirely by machinery. It may therefore properly be said that sanitary advantages are possessed by this present invention.

Having thus described my invention, what I claim as new is—

1. A chocolate confection comprising a body, a coating, and a separately-manufactured chocolate symbol or ornament attached to the coated surface.

2. The combination with a chocolate-coated edible body, of a chocolate symbol or ornament attached to said coated body, the said symbol or ornamentation being of a relatively hard consistence as compared with the coating of the body.

In testimony whereof I have affixed my signature in presence of two witnesses.

WINTHROP M. BAKER.

Witnesses:
 HERBERT E. JONES,
 A. W. HARRISON.